Oct. 6, 1931.     P. R. VAN BUSKIRK     1,826,375
APPARATUS FOR DRAWING TOPOGRAPHIC MAPS
Filed March 8, 1930     2 Sheets-Sheet 2
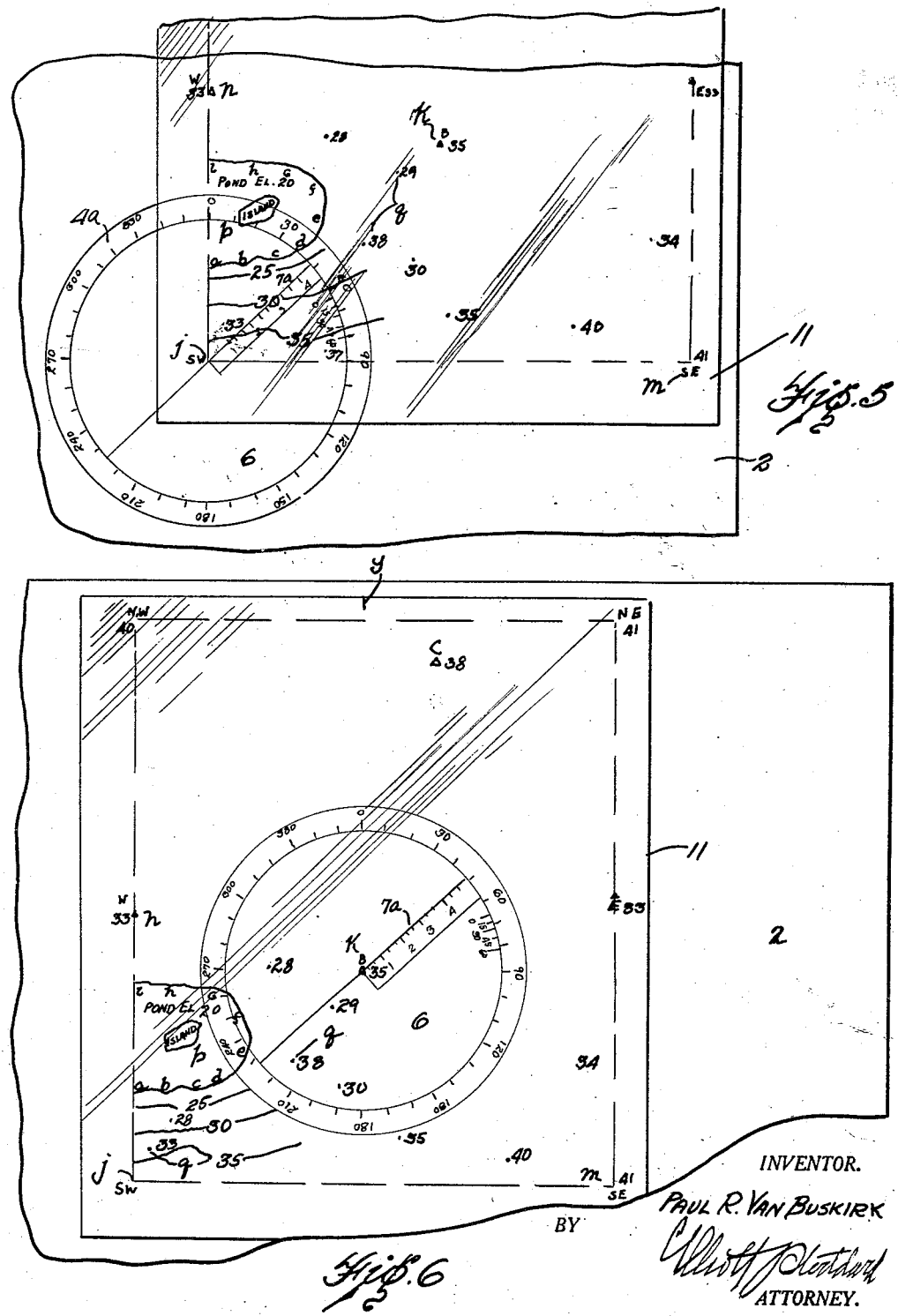
INVENTOR.
PAUL R. VAN BUSKIRK
BY
ATTORNEY.

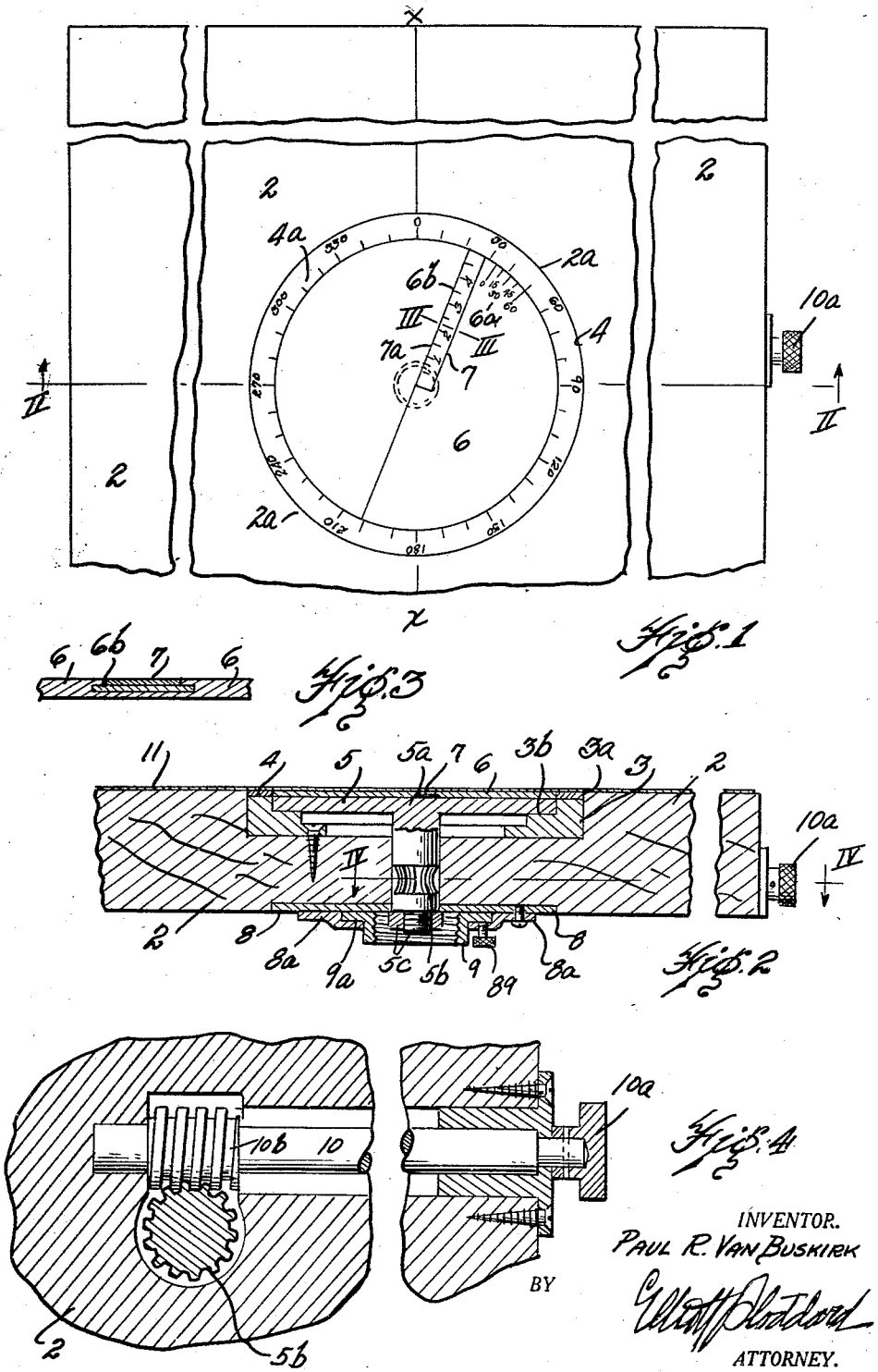

Patented Oct. 6, 1931

1,826,375

UNITED STATES PATENT OFFICE

PAUL R. VAN BUSKIRK, OF DETROIT, MICHIGAN

APPARATUS FOR DRAWING TOPOGRAPHIC MAPS

Application filed March 8, 1930. Serial No. 434,393.

My invention relates to a method and apparatus for drawing topographic maps and an object of my improvements is to provide an apparatus and method for quickly and accurately plotting transit and stadia survey data and drawing the complete topographic map while right on the ground. I secure this object by the method and apparatus hereafter described and illustrated in the accompanying drawings, in which:

Figure 1 is a plan view, partly broken away to economize space, of an apparatus embodying my invention.

Figure 2 is a detail section on the line II, II, Figure 1.

Figure 3 is a detail section on the line III, III, Figure 1.

Figure 4 is a detail section, partly broken away and to an enlarged scale, on the line IV, IV, Figure 2.

Figure 5 is a plan view, partly broken away to economize space, of the apparatus embodying my invention, illustrating one step in the use thereof.

Figure 6 is a view similar to Figure 5 illustrating another step in the use of said apparatus.

Referring in the first place to Figures 1 to 4 inclusive, 2 represents the conventional drawing board which is square with accurate linear edges. The board 2 is cut out at its center to form a round, or cylindrical, cavity 2a, the bounding wall of which is vertical and the lower wall, or bottom, flat and parallel to the surface of the board 2. Into the cavity 2a is fitted a metal ring 3 having a flat peripheral upper surface 3a slightly below the upper surface of the board 2 and parallel thereto. At a lower level and inside of the surface 3a the ring 3 is provided with a second annular surface 3b also parallel to the surface of the board. 4 is an ivoride ring shaped to and secured upon the surface 3a, with the surface of said ring in the same plane as the surface of the board 2 and forming an extension thereof. The inner upper edge of the ring 4 is provided with the usual angular scale 4a.

5 is a metal disc fitting and adapted to turn upon the surface 3b and having a coaxial stem, or cylindrical projection, 5a extending down from its center and fitting in a cylindrical aperture in the board 2. 5b are spiral gear teeth formed on the projection, or spindle, 5a and 5c is a nut engaging upon screwthreads on the lower end of the spindle 5b and holding the disc 5 firmly in place. 6 is an ivoride disc fitting and secured upon the surface of the plate, or disc, 5; its upper surface forming a continuation of the upper surface of the board 2 and the ring 4. 6b is a radial dove-tailed slot in the disc 6, one of its edges being accurately radial and intersecting the circumference of the disc 6 so as to form the index point to coact with the scale 4a. 6a is a vernier scale extending from said index point along the periphery of the disc 6. 7 is a strip having an ivoride upper surface and a linear scale along one of its edges adapted to engage and slide radially into the slot 6b, the surface of said strip forming a continuation of the surface of the disc 6.

10 (Figure 4) is a rod fitting into an aperture extending inward from the edge of the board 2 and having spiral teeth 10b on its inner end adapted to engage the teeth 5b on the projection 5a. 10a is a milled disc on the outer end of the rod 10, by which said rod may be turned to adjust the plate 5 with the disc 6 thereon to different angular positions.

8 is a metal plate set in and secured to the lower surface of the board 2 coaxial with the cavity 2a. 8a is a ring adapted to be secured upon the lower surface of the plate 8, concentric therewith and having its inner portion spaced from and parallel to said plate. 9 is a ferrule screwthreaded on its inner surface to engage the upper end of a tripod and having an annular flange at its inner end which engages under the flange of the ring 8a so as to make a tight joint upon which the board 2 may turn. 89 is a set-screw passing through the ring 8a and engaging the flange 9a of the ferrule 9, by which the board 2 may be clamped into any angular position at which it is set. 11 represents a sheet of transparent vellum tracing cloth, celluloid, or other transparent material passing over the whole face of the board 2.

The method embodying my invention is described as follows:

If one wishes to map a certain lot, or piece of land, he would set up the above described board upon its tripod in the field and dot a point $j$ upon the sheet 11, representing for instance the southwest corner of the lot, and place this dot directly over the center of the disc 6. The board 2 is turned until the zero of the scale $4a$ and the meridian line $x$—$x$ is approximately north. The center section, or disc 6, is then rotated until its index point points to zero. The distance to the northwest corner is then read by stadia and that distance is laid off along the scale $7a$, or an extension thereof, and a dot placed upon the paper to indicate this location and this dot may be connected with that over the center of the disc 6 by a line to represent the west line of the lot, or a line may be drawn above the meridian line $x$—$x$ to constitute a direct north and south orienting line.

Different points upon the surface of the lot are now located as follows. The angular direction from the southwest corner to each point $q$ is measured by the transit and its distance taken by stadia and the disc 6 is then turned to that angle and the distance marked off upon the scale $7a$. This is done for all desirable points within easy sight of the postion $j$. In this way various points $a, b, c, d, e, f, g, h, i$ upon the boundary of a pond $p$, for instance may be located and the outline of the pond be dotted in by connecting these points.

A point $k$ may then be located by taking its angular position by the transit and turning the disc 6 to the angle observed and then accurately measuring by a chain the distance between point $j$ to point $k$ and setting that off on the scale $7a$, or an extension thereof. The transit is then moved to the point in the lot corresponding to the point $k$, oriented with reference to the point $j$, and the angle taken between the line $kj$ and the line $km$ to the southeast corner $m$ and the distance $km$ accurately measured by a chain and the distance $jm$ may then be accurately calculated. A point $n$ between the southwest and northwest corners of the lot may then be selected and the angle from $j$ to $n$ may be measured and the distance from $k$ to $n$ measured and the distance $jn$ accurately calculated. This data is kept as traverse notes.

The sheet 11 is now moved until the point $k$ comes directly above the center of the disc 6 and is oriented either by placing the line from $j$ to $k$ directly over the backward extension of the radial scale $7a$ or by bringing the point $y$ on to the meridian line $x$—$x$, point $y$ being scaled the same distance east of the meridian $x, x$ on Figure 5 as point $k$ scales.

Different points $qa$ may then be located by stadia and angular measurements, as above described, and dotted down directly upon the map without the necessity of making notes and transferring the notes.

The elevation of each point as it is located is also observed and may be noted as the point is located upon the map and then contour lines drawn between points of equal altitudes, as indicated in Figures 5 and 6.

In this way the entire map can be made directly in the field without the necessity of taking notes and transcribing the same, or translating them into graphic notes.

What I claim is:

1. The combination of a drawing board, a rotatable disc set in said drawing board with its surface flush with the surface of the drawing board, said disc and drawing board being provided with an index and scale respectively, adapted to indicate the angular position of said disc relative to said board and a radial scale upon said disc as and for the purpose described.

2. Apparatus for use in plotting surveying data consisting of a drawing board, a rotatable disc set in said drawing board with its surface flush with the surface of the drawing board, said disc and drawing board being provided with an index and scale respectively adapted to indicate the angular position of said disc relative to said board, a radial scale upon said disc as and for the purpose described and a sheet of translucent material adapted to lie flat upon the surface of said disc and board.

3. The combination of a drawing board, a rotatable disc set in said drawing board with its surface flush with the surface of the drawing board, said disc and drawing board being provided with an index and scale respectively adapted to indicate the angular position of said disc relative to said board and a radial scale upon said disc as and for the purpose described, said scale being removable and replaceable.

4. The combination of a drawing board, a rotatable disc fixed in said drawing board with its surface in continuation of the surface of said board, said disc and board being provided with an index and scale respectively adapted to measure the angular position of said disc relative to said board, said disc being provided with a slot extending radially from its periphery to its center and a strip of material having a scale thereon adapted to removably fit into said slot with its surface flush with the surface of said disc.

In testimony whereof, I sign this specification.

PAUL R. VAN BUSKIRK.